United States Patent [19]

Kojima

[11] Patent Number: 4,797,916

[45] Date of Patent: Jan. 10, 1989

[54] TELEPHONE HANDSET CRADLE MOUNTING

[75] Inventor: Kazuo Kojima, Tokyo, Japan

[73] Assignee: Uniden Corporation of America, Indianapolis, Ind.

[21] Appl. No.: 120,045

[22] Filed: Nov. 13, 1987

[51] Int. Cl.$^4$ .................... H04M 1/11; H04M 1/12; F16M 11/12

[52] U.S. Cl. .................... 379/454; 248/183; 248/278; 379/426; 379/435; 379/445; 379/441

[58] Field of Search .............. 379/454, 426, 428, 435, 379/436, 441, 445, 447, 449, 457, 58; 248/1 F, 183, 278

[56] References Cited

U.S. PATENT DOCUMENTS

| | | | |
|---|---|---|---|
| 2,896,901 | 7/1959 | Levy et al. | 248/278 |
| 2,898,068 | 8/1959 | Warren | 248/183 |
| 4,097,012 | 6/1978 | McIntyre | 248/278 |
| 4,196,319 | 4/1980 | Gates | 379/454 |
| 4,560,831 | 12/1985 | Bast et al. | 379/454 |
| 4,617,430 | 10/1986 | Bryant | 379/449 |
| 4,680,790 | 7/1987 | Packard et al. | 379/454 |

FOREIGN PATENT DOCUMENTS

| | | | |
|---|---|---|---|
| 3306679 | 8/1984 | Fed. Rep. of Germany | 379/435 |
| 649260 | 12/1978 | France | 379/454 |
| 56716 | 6/1936 | Norway | 379/454 |
| 160590 | 5/1933 | Switzerland | 379/454 |

OTHER PUBLICATIONS

Fujitsu Co.-Adjustable Mounting Bracket Part No. M01P-1899-B001-#1.

Primary Examiner—Jin F. Ng
Assistant Examiner—Danita R. Byrd
Attorney, Agent, or Firm—Barnes & Thornburg

[57] ABSTRACT

A telephone handset mounting cradle includes a housing provided along its lower edge with opposed oppositely opening grooves. The bottom of the housing includes a relief. A bracket includes opposed, facing slides for engaging the grooves and a spring clip for engaging the relief to lock the cradle to the bracket. A screw pivotally couples the bracket to a first plate about a first axis. Additional screws pivotally couple the first plate to a second plate about a second axis perpendicular to the first. The second plate includes provisions for fixed mounting to a surface.

5 Claims, 2 Drawing Sheets

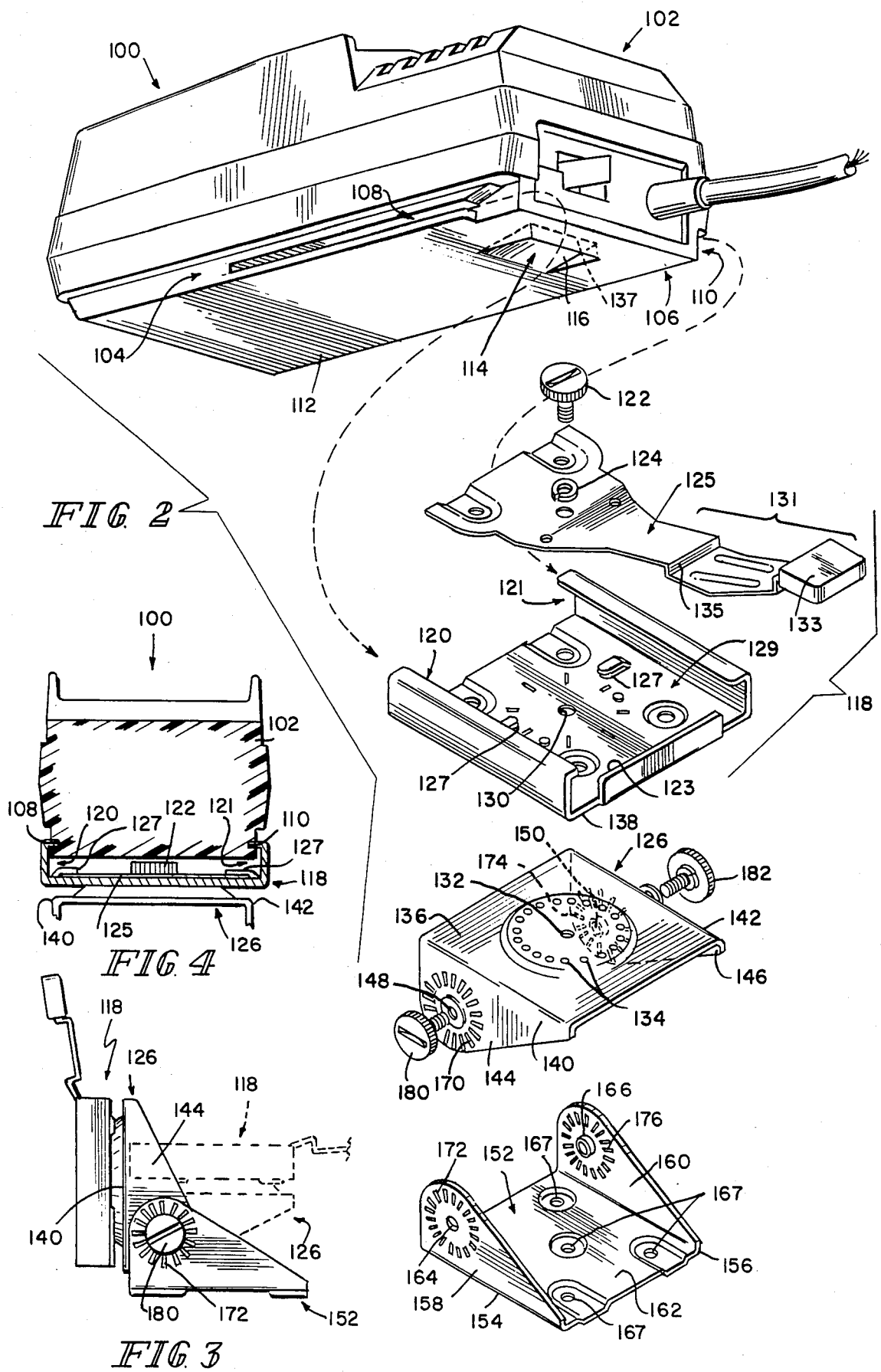

TELEPHONE HANDSET CRADLE MOUNTING

BACKGROUND AND SUMMARY OF THE INVENTION

This invention relates to improvements in handset cradle mountings and particularly to a handset cradle mounting for a mobile telephone handset.

It is convenient when mounting the handset cradle of a mobile telephone to be able to orient the handset cradle in any of a number of preferred orientations. As a consequence, some manufacturers provide mounting brackets adjustable to desired orientations with their mobile telephone handsets. However, the available adjustable mounting brackets permit only a single relative adjustment of the two principal components of the mounting bracket.

Accordingly, it is an object of the present invention to provide an adjustable cradle mounting bracket which permits an additional adjustment of the handset cradle.

According to the invention, apparatus for mounting a mobile telephone handset cradle from the interior of a vehicle or the like comprises a base for mounting from the interior of the vehicle or the like, means for mounting the cradle, and means for rotatably mounting the means for mounting the cradle to the base. The rotatable mounting means provides substantially 360° relative rotation between the means for mounting the cradle and the base.

Additionally according to the invention, one of the cradle and the means for mounting the cradle includes means for providing a pair of grooves. The other of the cradle and the means for mounting the cradle includes means for providing a pair of opposed tongues. The tongues are proportioned for engagement with the grooves for attachment of the cradle to the means for mounting the cradle.

Further according to this aspect of the invention, the means for providing the pair of grooves comprises means for providing a pair of generally oppositely opening grooves opening generally away from each other, and the means for providing a pair of opposed tongues comprises means for providing a pair of tongues projecting generally toward each other.

Further according to this aspect of the invention, the cradle includes a housing having a pair of opposed, generally parallel sidewalls, each of said opposed sidewalls including meas providing one of said grooves, the grooves in the opposed sidewalls opening generally away from each other. The means for mounting the cradle includes the means providing a pair of tongues. The tongues project generally toward each other.

Additionally according to the invention, the housing further includes a bottom wall extending between the sidewalls and two opposed, generally parallel end walls extending between the two sidewalls. The outwardly opening grooves each include a first end opening into one of the end walls of the housing to permit sliding engagement of the tongues into respective grooves. The bottom wall further includes means for providing a recess having an end wall which extends generally parallel with, and lies between, the end walls.

Additionally according to this aspect of the invention, the means for mounting the cradle includes a resiliently deflectable member for engaging the cradle. The resiliently deflectable member extends generally longitudinally between the tongues. The resiliently deflectable member lies between the tongues and is resiliently deflectable generally perpendicularly to them. First and second stop means are provided for retaining the cradle on the means for mounting the cradle. The first stop means is provided on the resiliently deflectable member. The first stop means engages the end wall of the recess Each of the grooves further comprises a second end. The second end of at least one of the grooves lies between the opposed end walls and comprises the second stop means.

According to another aspect of the invention, the base comprises a first plate having side edges, a second plate having side edges, means defining a pivot axis on the first plate, means defining a pivot axis on the second plate, and means for pivotally joining the first and second plates at their pivot axes to provide relative adjustment between the first and second plates.

Additionally according to this aspect of the invention, the means for pivotally joining the first and second plates at their pivot axes to provide relative adjustment between the first and second plates comprises means for pivotally joining the first and second plates at their pivot axes to provide relative adjustment between the first and second plates to at least a substantially 90° relative orientation.

Additionally, according to this aspect of the invention, the means defining a pivot axis on the first plate comprises two opposed side edges of the first plate, and means for defining an ear along each of the two opposed side edges of the first plate. The ears project away from the first plate in the same direction. Means are provided for defining an opening in each of the ears associated with the first plate. The openings in the ears of the first plate define the pivot axis of the first plate. The means defining a pivot axis on the second plate comprises two opposed side edges of the second plate, and means for defining an ear along each of the two opposed side edges of the second plate. The ears project away from the second plate in the same direction. Means are provided for defining an opening in each of the ears associated with the second plate. The openings in the ears of the second plate define the pivot axis of the second plate.

BRIEF DESCRIPTION OF THE DRAWINGS

The invention may best be understood by referring to the following detailed description and accompanying drawings which illustrate the invention. In the drawings:

FIG. 2 illustrates an exploded perspective view of a telephone handset cradle and mounting bracket which permits adjustment of the orientation of the cradle with an additional degree of freedom;

FIG. 3 illustrates an end elevational view of the mounting and cradle of FIG. 2.

FIG. 4 illustrates a side elevational view of the mounting and cradle of FIG. 2, with the 90° position of the mounting and cradle illustrated in solid lines and the 0° position of the mounting and cradle illustrated in broken lines; and

DETAILED DESCRIPTION OF THE DRAWINGS

Figure 1:
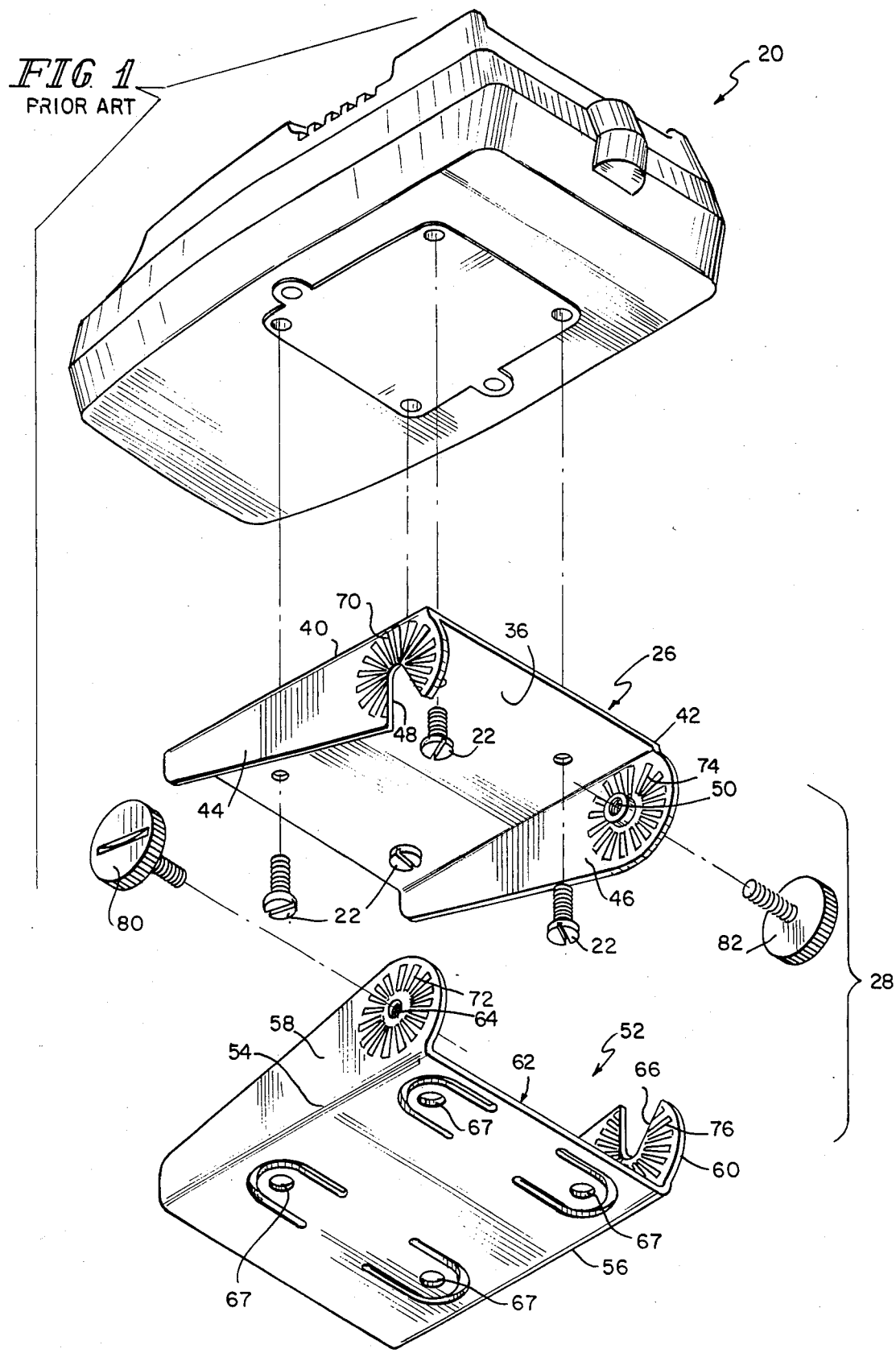
FIG. 1 illustrates an exploded perspective view of a prior art telephone handset cradle and mounting bracket which limits the adjustment of the orientation of the cradle to a single degree of freedom.

Referring now to FIG. 1, a prior. art-telephone handset mounting cradle 20 is mounted by means of four screws 22 to one component, an upper plate 26, of a telephone handset cradle mounting 28. Plate 26 is generally rectangular in plan view, providing a pair of opposed side edges 40, 42. Ears 44, 46 project from edges 40, 42, respectively, generally perpendicular to the bottom surface 36 of plate 26. Ear 44 is provided with an inverted somewhat V-shaped notch. Ear 46 is provided with a threaded opening 50 aligned generally with the bottom of the V-shaped notch in ear 44.

The mounting 28 further includes a lower plate 52 which is generally rectangular in plan view, providing a pair of opposed side edges 54, 56. Ears 58, 60 project from edges 54, 56, respectively, generally perpendicular to the top surface 62 of plate 52. Ear 58 is provided with a threaded opening 64. Ear 60 is provided with a somewhat V-shaped notch 66, the bottom of which is aligned with opening 64. Complementary bosses 70, 72 are formed around notch 48 and opening 64, respectively. Complementary bosses 74, 76 are formed around opening 50 and notch 66, respectively. Plate 52 is provided with openings 67 through which suitable fasteners (not shown) can be inserted to mount plate 52 from a suitable surface, such as a surface of a vehicle console or dashboard, where the telephone handset is to be placed. Plates 26, 52 are assembled in a desired orientation by threading a screw 80 into opening 64 and by threading a screw 82 into opening 50 and then assembling plates 26, 52 together with the aid of notches 48, 66. After plates 26, 52 have been adjusted to the appropriate orientation, screws 80, 82 are tightened to engage bosses 70, 72 and 74, 76 to maintain plates 26, 52 in the desired orientation.

Referring now to FIG. 2, a telephone handset mounting cradle 100 according to the present invention includes a housing 102 provided along its lower edges 104, 106 with outwardly opening grooves 108, 110, respectively. The bottom 112 of housing 102 is provided with a relief 114 having an upwardly sloping floor 116. A cradle mounting bracket 118 has two parallel, opposed, facing generally C-shaped slides 120, 121 provided along its side edges. A stop 123 is formed on one end edge of bracket 118 between slides 120, 121. A spring steel retaining clip 125 is mounted beneath stamped ears 127 to the top surface 129 of bracket 118. An end region 131 of clip 125 lies away from top surface 129 but is resiliently deflectable toward top surface 129 by the application of pressure to a rubber-coated release pad 133 of end region 131. Region 131 also includes a generally vertically extending wall 135 which cooperates with a generally vertically extending wall 137 of relief 114 to lock cradle 100 releasably on bracket 118 when cradle 100 is slid onto slides 120, 121 until slides 120, 121 fully engage their respective grooves 108, 110.

Bracket 118 is pivotally mounted by means of a screw 122 and lock washer 124 to a plate 126. Screw 122 passes through an unthreaded aperture 130 in bracket 118 and into a threaded aperture 132 in plate 126. Complementary bosses 134 formed in the top surface 136 of plate 126 and bosses (not shown) formed in the bottom surface 138 of bracket 118 engage in various orientations and permit lockig of bracket 118 in essentially 360° relative orientation with respect to plate 126 by tightening screw 122 into aperture 132. Plate 126 is generally rectangular in plan view, providing a pair of opposed side edges 140, 142. Ears 144, 146 project from edges 140, 142, respectively, generally perpendicular to the top surface 136 of plate 126. Ears 144, 146 are provided with aligned openings 148, 150, respectively. Opening 148 is threaded. Opening 150 is not.

The mounting 128 further includes a lower plate 152 which is generally rectangular in plan view, providing a pair of opposed side edges 154, 156. Ears 158, 160 project from edges 154, 156, respectively, generally perpendicular to the top surface 162 of plate 152. Ears 158, 160 are provided with aligned openings 164, 166, respectively. Opening 164 is unthreaded. Opening 166 is threaded. Complementary bosses 170, 172 are formed around openings 148, 164, respectively. Complementary bosses 174, 176 are formed around openings 150, 166, respectively. Plate 152 is provided with openings 167 through which suitable fasteners (not shown) can be inserted to mount plate 152 from a suitable surface, such as a surface of a vehicle console or dashboard, where the telephone handset is to be placed. Plates 126, 152 are assembled in a desired orientation, which can exceed 90° with respect to each other (see FIG. 3), by aligning openings 148, 164 and threading a screw 180, provided with a lock washer and a thrust washer, into opening 148 and into opening 164 and by inserting a screw 182, provided with a lock washer and a thrust washer, into opening 150 and then threading screw 182 into opening 166. After plates 126, 152 have been adjusted to the appropriate orientation, screws 180, 182 are tightened to engage bosses 170, 172 and 174, 176 to maintain plates 126, 152 in the desired orientation.

The mounting according to the present invention thus provides substantially increased flexibility over the prior art mounting in the range of orientation of the telephone handset cradle, and therefore in the range of orientation of the handset itself, with respect to the surface to which the mounting is fixed. Not only does the mounting configuration of FIGS. 2–4 permit an orientation of cradle mounting bracket 118 between the horizontal orientation illustrated in broken lines and the vertical (90°) orientation illustrated in solid lines in FIG. 4, but it also permits 360° rotation adjustment of the cradle mounting bracket 118 about the axis established by screw 122. This permits much greater flexibility in positioning the handset cradle 120 and handset (not shown) with respect to the surface upon which plate 152 is mounted.

What is claimed is:

1. Apparatus for mounting a mobile telephone handset cradle from the interior of a vehicle or the like, the apparatus comprising a base for mounting from the interior of the vehicle or the like, means for mounting the cradle, and means for rotatably mounting the means for mounting the cradle to the base, the rotatable mounting means providing substantially 360° relative rotation between the means for mounting the cradle and the base, a mobile telephone handset cradle, one of the cradle and the means for mounting the cradle including means for providing a pair of grooves, the other of the cradle and the means for mounting the cradle including means for providing a pair of opposed tongues, the tongues proportioned for engagement with the grooves for attachment of the cradle to the means for mounting the cradle.

2. The apparatus of claim 1 wherein the means for providing the pair of grooves means for providing a pair of generally oppositely opening grooves opening generally away from each other, and the means for providing a pair of opposed tongues comprises means for providing a pair of tongues projecting generally toward each other.

3. The apparatus of claim 2 wherein the cradle includes a housing having a pair of opposed, sidewalls, each of said opposed sidewalls including means providing one of said grooves, the means for mounting the cradle including the means providing a pair of tongues.

4. The apparatus of claim 3 wherein said housing further includes a bottom wall extending between the sidewalls and two opposed end walls extending between said two sidewalls, said outwardly opening grooves each including a first end opening adjacent one of said end walls of said housing to permit sliding engagement of said tongues into respective ones of said grooves, said bottom wall further including means for providing a recess having an end wall which extends generally perpendicular to said bottom wall and lies between said end walls.

5. The apparatus of claim 4 wherein said means for mounting the cradle includes a resiliently deflectable member for engaging said cradle, said resiliently deflectable member extending generally longitudinally between said tongues, said resiliently deflectable member lying between said tongues and being resiliently deflectable generally perpendicualrly to them, first and second stop menas for retaining said cradle on said means for mounting the cradle, said first stop means provided on said resiliently deflectable member, said first stop means for engaging said end wall of said recess, each of said grooves further comprises a second end, and said second stop means comprises said second end of at least one of said grooves lying between said opposed end walls of said housing.

* * * * *

UNITED STATES PATENT AND TRADEMARK OFFICE
CERTIFICATE OF CORRECTION

PATENT NO. : 4,797,916
DATED : January 10, 1989
INVENTOR(S) : Kazuo Kojima It is certified that error appears in the above-identified patent and that said Letters Patent is hereby corrected as shown below:

At column 1, line 48, please delete "meas" and insert therefor --means--;

At column 2, line 5, after the word "recess", please insert --.-- (period);

At column 4, line 43, please delete "4" and insert therefor --3--;

At column 4, line 67, after the word "grooves", please insert the word --comprises--; and At column 6, line 10, please delete "menas" and insert therefor --means--.

Signed and Sealed this

Second Day of May, 1989

*Attest:*

DONALD J. QUIGG

*Attesting Officer*  *Commissioner of Patents and Trademarks*